United States Patent [19]
Shigematsu et al.

[11] Patent Number: 5,548,675
[45] Date of Patent: Aug. 20, 1996

[54] MULTIFIBER CONNECTOR, A METHOD OF MANUFACTURING THE SAME, AND A CONSTRUCTION FOR CONNECTING THE MULTIFIBER CONNECTOR TO AN OPTICAL DEVICE

[75] Inventors: Takashi Shigematsu; Hisaharu Yanagawa; Takeo Shimizu; Shiro Nakamura; Kazuya Fukasawa; Tomohiro Watanabe, all of Tokyo, Japan

[73] Assignee: The Furukawa Electric Co., Ltd., Tokyo, Japan

[21] Appl. No.: 335,769

[22] PCT Filed: Mar. 31, 1994

[86] PCT No.: PCT/JP94/00536

§ 371 Date: Nov. 8, 1994

§ 102(e) Date: Nov. 8, 1994

[87] PCT Pub. No.: WO94/23321

PCT Pub. Date: Oct. 13, 1994

[30] Foreign Application Priority Data

Apr. 2, 1993 [JP] Japan .......................... 5-76711
Dec. 7, 1993 [JP] Japan ....................... 5-340446
Dec. 7, 1993 [JP] Japan ....................... 5-340447
Jan. 28, 1994 [JP] Japan .......................... 6-8162

[51] Int. Cl.[6] .............................. G02B 6/00; G02B 6/36
[52] U.S. Cl. ................................................................. 385/80
[58] Field of Search ........................................ 385/80–89

[56] References Cited

U.S. PATENT DOCUMENTS

| | | | |
|---|---|---|---|
| 4,647,147 | 3/1987 | Pikulski et al. | 385/80 |
| 4,722,584 | 2/1988 | Kakii et al. | 385/80 |
| 4,743,084 | 5/1988 | Manning | 385/80 |
| 4,812,002 | 3/1989 | Kato et al. | 385/80 |
| 5,231,685 | 7/1993 | Hanzawa et al. | 385/84 |

FOREIGN PATENT DOCUMENTS

| | | |
|---|---|---|
| 60-14326 | 4/1985 | Japan . |
| 60-257410 | 12/1985 | Japan . |
| 63-162305 | 10/1988 | Japan . |
| 63-278004 | 11/1988 | Japan . |
| 1-125409 | 8/1989 | Japan . |
| 2-30911 | 2/1990 | Japan . |
| 3-29905 | 3/1991 | Japan . |
| 3-167510 | 7/1991 | Japan . |
| 2239104 | 6/1991 | United Kingdom . |
| WO87/01464 | 3/1987 | WIPO . |

OTHER PUBLICATIONS

Patent Abstract of Japan, vol. 10, No. 154 (P–463) (2210) Jun. 4, 1986 & JP–A–61 007 811 (SUMITOMO).

*Primary Examiner*—Akm E. Ullah
*Attorney, Agent, or Firm*—Frishauf, Holtz, Goodman, Langer & Chick

[57] ABSTRACT

An optical fiber end portion (10) which has a ferrule (11) which comprises a butting end face (11e) opposed to or butted against an optical device (20), and a single fiber hole or a plurality of fiber holes formed in parallel at predetermined intervals, into which one end of optical fiber (13a) is inserted, the optical fiber being optically connected to said optical device, a method for manufacturing the optical fiber end portion, and a construction for connecting the end portion to the optical device. The ferrule is formed of a molded product of synthetic resin, and is provided with at least one connecting member (12) on the side of butting end face connected to the optical device. The connecting member (12) has a linear expansion coefficient set at a value smaller than the linear expansion coefficient of a synthetic resin forming the ferrule.

37 Claims, 12 Drawing Sheets

F I G. 12
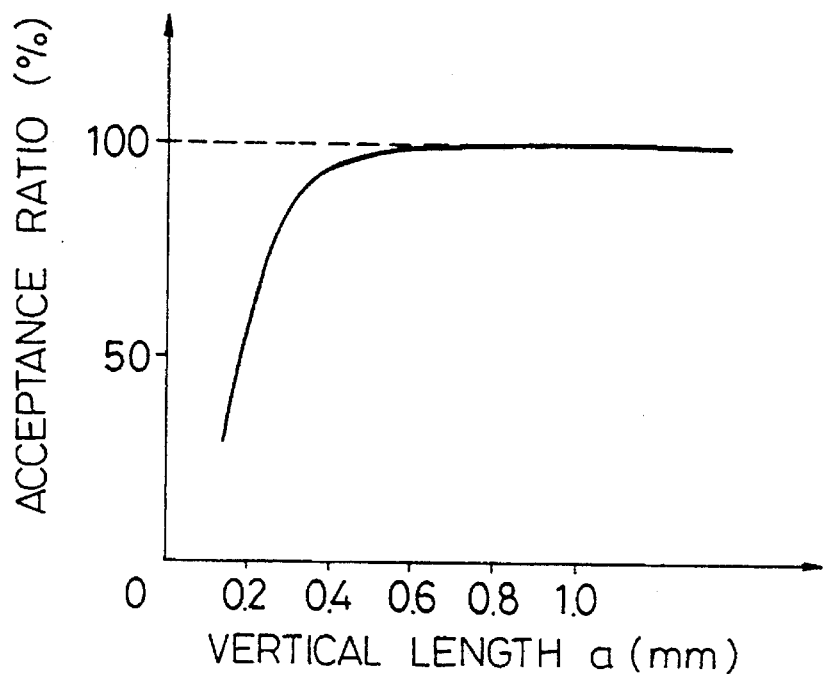
F I G. 13
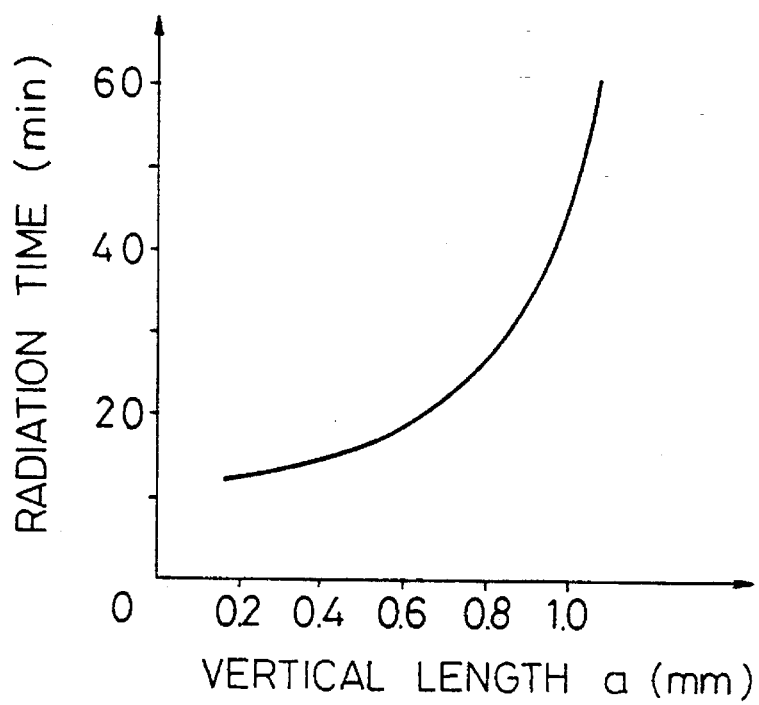

MULTIFIBER CONNECTOR, A METHOD OF MANUFACTURING THE SAME, AND A CONSTRUCTION FOR CONNECTING THE MULTIFIBER CONNECTOR TO AN OPTICAL DEVICE

TECHNICAL FIELD

The present invention relates to an optical fiber end portion, a method for manufacturing the same, and construction for connecting the end portion to an optical device.

BACKGROUND ART

The optical connection between an optical device such as an optical waveguide component, an optical semiconductor device (LD array, LED array), etc. and optical fiber has so far been made by the following procedure. An optical fiber end portion, in which a plurality of optical fibers are arranged at predetermined intervals, is butted against an optical device, or the optical fiber end portion and the optical device are disposed in opposition to each other. Then, alignment is performed to align optical axes between the optical fiber and the optical device. After that, both elements are bonded by an adhesive such as a heat curing type or a light (ultraviolet rays) curing type. Alternatively, an optical fiber end portion and an optical device are opposed to each other with a predetermined gap between them, optical axes are aligned between the optical fiber and the optical device, and then the optical fiber end portion and the optical device are welded to a metal base.

As a first example of such a connection between an optical fiber end portion and an optical device, for example, the connection between an optical fiber end portion and an optical waveguide component is known.

The optical fiber end portion has a tape fiber, in which a plurality of optical fibers are arranged at predetermined intervals in a coating, and a ferrule. The ferrule has a butting end face, which is disposed in opposition to or butted against an optical waveguide component, and a plurality of fiber holes formed in parallel at predetermined intervals. One end of the optical fiber is inserted into each of the fiber holes and bonded, and the optical fiber is exposed to the butting end face. The most inexpensive and general method for manufacturing the ferrule is plastic molding performed by using a mold.

The optical waveguide component consists of a waveguide substrate and a waveguide layer, and sometimes a cover is bonded onto the waveguide layer. In the waveguide layer, single or plural waveguides are formed, and the waveguides are exposed to the butting end face at both ends. The cover serves to ensure an effective area for bonding to the optical fiber end portion by making the area and shape of the butting end face of the optical waveguide component substantially equal to those of the butting end face of the optical fiber end portion.

The aforementioned optical fiber end portion is butted against the optical waveguide component through their butting end faces, and is bonded to the optical waveguide component after alignment is performed between each optical fiber and the corresponding waveguide.

When the optical fiber end portion is bonded to the optical waveguide component, it is necessary to align the optical fiber and the corresponding waveguide on the order of submicrons, and to bond and fix the optical fiber end portion to the optical waveguide component in a short period of time while maintaining the aligned condition in order to minimize the connection loss at the optical fiber end, particularly for optical fiber of single mode.

As the bonding means, a heat curing type adhesive such as epoxy resin, which cures at a high speed, is used. The optical fiber end portion is bonded to the optical waveguide component at portions excluding the portion where the optical fibers and waveguides are exposed to the butting end face to prevent the interruption of the optical path between each optical fiber and the corresponding waveguide.

As a second example, the connection of another construction between the optical fiber end portion and the optical waveguide component is also known.

This optical fiber end portion has a tape fiber, a V-grooved base plate, and a press cover, and a butting end face is formed at each end thereof. The tape fiber has a plurality of optical fibers arranged at predetermined intervals in a coating. The end portion of each optical fiber is exposed by removing the coating from the end portion of the optical fiber. The exposed end portion of each optical fiber is positioned by each V groove formed in the V-grooved base plate, and each optical fiber is fixed to the V-grooved base plate by a press cover.

The end face of the optical fiber is exposed to the butting end face, and is polished together with the V-grooved base plate and the press cover. The V-grooved base plate and the press cover are made of an optically transparent material such as glass.

The optical waveguide component is configured in a similar way to the optical waveguide component of the aforementioned first example, and the cover is made of an optically transparent material such as glass.

The optical fiber end portion is butted against the optical waveguide component through their butting end faces, and is bonded to the optical waveguide component with a light curing type adhesive while irradiating light (ultraviolet rays) after alignment is performed between each optical fiber and the corresponding waveguide.

In this process, since the V-grooved base plate and the press cover are made of an optically transparent material, the transmitting ultraviolet rays cure the adhesive in a shorter period of time as compared with the aforementioned heat curing type adhesive such as epoxy resin, which cures at a high speed. Therefore, the optical fiber end portion is bonded to the optical waveguide component rapidly at the butting end face.

Further, as a third example, the connection between the optical fiber end portion of the above second example and an optical semiconductor is also known.

The optical semiconductor has a heat sink arranged between an LD array, in which a plurality of laser diode elements are arranged in line, and a carrier. Each laser diode element is electrically connected to the carrier with a bonding wire, and the carrier is fixed to a metallic mount base.

On the other hand, the optical fiber end portion is welded to a metallic base via a sub-base. Each optical fiber in the tape fiber is aligned with the corresponding laser diode element, and the base is welded to the mount base.

The above-described connections between the optical fiber end portion and the optical device pose problems described below.

First, in the connection between the optical fiber end portion and the optical waveguide component as described in the first example, for example, when the optical waveguide component is silica-type one in which silica-type waveguide layer is formed on a silicon substrate, the optical waveguide component has a linear expansion coefficient of about $2.4 \times 10^{-6}$ at about 20° C. For the optical fiber end portion, the linear expansion coefficient of plastic material forming the ferrule is, for example, $5 \times 10^{-6}$ or more at about 20° C. when the material is an epoxy resin containing fine particles of silicon dioxide ($SiO_2$) as a filler.

For this reason, after the optical fiber end portion is connected to the optical waveguide component, the difference in linear expansion coefficient between these elements caused by a temperature change with time in the working environment disturbs the aligned condition between each waveguide and optical fiber, resulting in the decrease in performance such as increase in connection loss and the loss of function.

The ferrule of the optical fiber end portion is manufactured by plastic molding using a mold. Therefore, if the linear expansion coefficient in the direction in which a plurality of fiber holes are arranged differs from the linear expansion coefficient in the direction perpendicular to the arranging direction, deformation such as a warp is produced on the ferrule, so that fiber holes cannot be formed with high accuracy.

Further, the ferrule of the optical fiber end portion has so far used an optically opaque material by containing filler etc. in an epoxy resin to decrease the linear expansion coefficient and improve the strength and dimensional accuracy. Therefore, it has been very difficult to connect the conventional optical fiber end portion to the optical waveguide component by using a light curing type adhesive.

For the optical fiber end portions described in the second and third examples, an optically transparent material such as silicon and ceramics as well as the aforementioned glass can be used as a material for the V-grooved base plate and press cover.

However, since glass, silicon, and ceramics are hard and brittle, it is difficult to grind the V grooves, and the polishing property of the butting end face is poor, so that the machining cost is high.

Also, the optical fiber end portion is assembled by positioning fine optical fibers by the V grooves and by fixing optical fibers to the V-grooved base plate by using the press cover, so that the workability in assembly is poor.

Moreover, since the construction is such that the optical fibers are fixed by the press cover, if the press cover presses the optical fibers excessively, the optical fiber is broken easily when a stress acts on the optical fiber extending from the V-grooved base plate.

This invention was made to solve the above problems. Accordingly, an object of the present invention is to provide an optical fiber end portion which can be formed with high accuracy and therefore can be connected to an optical device accurately, a method for manufacturing such optical fiber end portions, and construction for connecting the end portion to an optical device.

Another object of the present invention is to provide an optical fiber end portion which can be manufactured easily at a low cost and in which optical fibers are less prone to be broken, a method for manufacturing such optical fiber end portions, and construction for connecting the end portion to an optical device.

DISCLOSURE OF THE INVENTION

To achieve the above object, the present invention provides an optical fiber end portion having a ferrule which comprises a butting end face opposed to or butted against an optical device, and a single fiber hole or a plurality of fiber holes formed in parallel at predetermined intervals, into which one end of the optical fiber is inserted, the optical fiber being optically connected to the optical device, wherein the ferrule is made of a molded product of synthetic resin, and at least one connecting member is installed on the side of the butting end face connected to the optical device.

The optical fiber end portion thus configured can be easily manufactured, and has an improved connecting property because of being connected to the optical device via the connecting member.

Preferably, the connecting member has a linear expansion coefficient $\alpha_{CM}$ which is set at a value smaller than the linear expansion coefficient $\alpha_{FP}$ of the synthetic resin forming the ferrule.

For this optical fiber end portion, the connecting member restricts thermal expansion and shrinkage of the synthetic resin forming the ferrule in molding the ferrule.

Preferably, the connecting member is made of an optically transparent material, for example, glass at least a part of which is exposed to the outer periphery of the butting end face of the ferrule.

Thereupon, the optical fiber end portion can be connected in a short period of time by using a light curing type adhesive because light transmits the portion of the connecting member.

Preferably, the ferrule is a molded product formed of any of thermosetting, thermoplastic, and light-curing synthetic resins.

For this optical fiber end portion, the ferrule can be molded at a low cost by using a mold.

Preferably, the synthetic resin forming the ferrule contains a coupling agent and silicon dioxide as a filler.

For this optical fiber end portion, the adhesion between the ferrule and the connecting member made of glass is improved.

Preferably, the synthetic resin forming the ferrule has a refractive index close to that of the silicon dioxide. More specifically, it is an optically transparent material which does not contain coloring component or carbon.

Thereupon, irradiated light easily passes through the optical fiber end portion in connecting the end portion to the optical device, so that the light-curing adhesive used cures in a short period of time. Also, the absorption of irradiated light by the ferrule decreases, so that heat generation at the optical fiber end portion can be reduced, by which the change in dimensions of the ferrule due to the rise in temperature can be restricted.

Preferably, the connecting member is made of glass having a linear expansion coefficient $\alpha_{CM}$ which provides the relationship of $|\alpha_{CM} - \alpha_{OD}| < 5 \times 10^{-6}$, where $\alpha_{OD}$ is the linear expansion coefficient of the material of the optical device, or made of metal which is butted against and welded to a metallic member installed at the corresponding position of the optical device, and has a linear expansion coefficient $\alpha_{MC}$ which provides the relationship of $|\alpha_{MC} - \alpha_{OD}| < 5 \times 10^{-6}$, where $\alpha_{MO}$ is the linear expansion coefficient of the metallic member.

Thereupon, since the difference in linear expansion coefficient between the optical fiber end portion and the optical device caused by the temperature change with time is small, the change in dimensions due to the temperature change is kept small, so that the decrease in performance such as increase in connection loss with time and the loss of function can be prevented.

Preferably, the connecting member has an opening surrounding the periphery of the butting end face of the ferrule, and the size of the opening is determined so that a length a in the direction at right angles to the direction in which optical fibers are arranged is set so as to fall within the range between 0.2 and 1.0 mm, and a length b in the direction in which optical fibers are arranged is set so as to provide the relationship of b=P×(N−1)+a, where N is the number of optical fibers fixed to the ferrule, and P is the arrangement interval of optical fibers.

Thereupon, in the optical end portion, the ratio of the area of the connecting member to the whole area of the butting end face can be set properly.

Also, according to the method for manufacturing an optical fiber end portion in accordance with the present invention, a set of molds, a core which is disposed between the set of molds and has a plurality of molding pins for forming fiber holes into which a plurality of optical fibers are inserted, and a connecting member on at least one end side of the core are arranged; a ferrule is molded by injecting synthetic resin into a cavity formed by the set of molds, the core, and the connecting member; and one end of the respective optical fibers are fixed by inserting and bonding the optical fibers to the fiber holes in the ferrule.

Thereupon, an optical fiber end portion is manufactured which can be manufactured easily at a low cost and in which optical fibers are less prone to be broken.

Further, according to the construction for connecting the optical fiber end portion to the optical device in accordance with the present invention, the optical fiber end portion is connected to an optical device so as to be opposed to or butted against the optical device.

At this time, it is preferable that the optical device be an optical waveguide component in which a plurality of waveguides are formed at arrangement intervals equal to those of the plural optical fibers, and be bonded to the optical fiber end portion defined in any one of claims 3 to 8 at the portion of a connecting member installed on the ferrule by means of an ultraviolet-curing adhesive.

Thereupon, the optical fiber end portion can be connected to the optical waveguide component in a short period of time.

Preferably, the optical device is an optical waveguide component in which a plurality of waveguides are formed at arrangement intervals equal to those of the plural optical fibers and which has a metallic tube surrounding the outer periphery, and is welded to the optical fiber end portion at the end face of the metallic tube.

Preferably, the optical device, being an optical semiconductor in which a plurality of laser diode elements are arranged, is mounted on a first metal base, the optical fiber end portion is mounted on a second metal base so as to be in opposition to the optical device, the end portion is mounted so that the optical fibers are aligned with the corresponding laser diode elements, and the first and second metal bases are welded to each other.

This provides a connecting construction in which the optical fiber end portion is connected to the optical waveguide component or the optical semiconductor by welding.

The term "optically transparent" used in this specification means that the transmissivity of visible rays and ultraviolet rays is at least 10%.

Also, different linear expansion coefficients used hereinafter in this specification indicate those at about 20° C.

BRIEF DESCRIPTION OF THE DRAWINGS

FIG. 12 is a characteristic diagram showing the relationship between the vertical length a of the opening of a connecting member and the acceptance ratio (%) in relation to the troubles associated with the molding pins;

FIG. 13 is a characteristic diagram showing the relationship between the vertical length a of the opening of a connecting member and the radiation time of ultraviolet rays required for bonding a ferrule to an optical waveguide component with an ultraviolet-curing adhesive for a molded ferrule;

BEST MODE FOR CARRYING OUT THE INVENTION

First Embodiment

Figure 1:
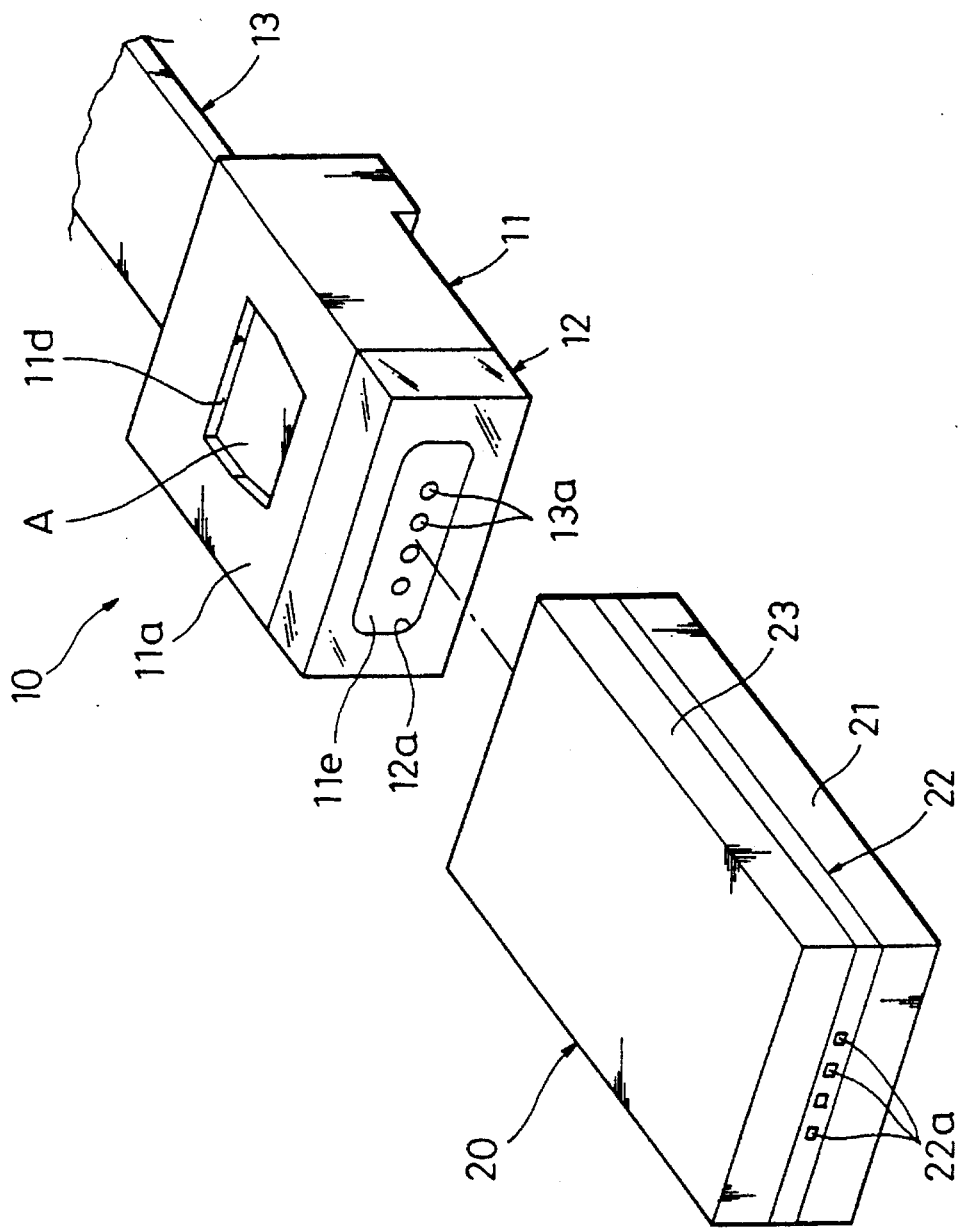
FIG. 1 is a perspective view showing an optical fiber end portion and construction for connecting the end portion to an optical waveguide component, illustrating a first embodiment of the present invention.

A first embodiment of the present invention will be described in detail below with reference to FIGS. 1 to 19.

The optical fiber end portion (hereinafter called "end portion") 10 of this embodiment includes a ferrule 11 with a connecting member 12 and a tape fiber 13 attached thereto. The end portion 10 is butted against and bonded to an optical waveguide component 20 by using an ultraviolet-curing adhesive.

The ferrule 11 is formed of an optically transparent synthetic resin having a low heat shrinkage coefficient. In this embodiment, a thermosetting epoxy resin was used as this synthetic resin, which epoxy resin contains 70 percent or more by weight of silicon dioxide particles as a filler, has a refractive index substantially equal to that of silicon dioxide, and has the linear expansion coefficient $\alpha_{FP}$ of $12 \times 10^{-6}$.

The thermosetting synthetic resin, for example, epoxy resin contains a coupling agent for increasing the bonding strength between the resin and silicon dioxide particles. Therefore, the adhesion to the connecting member 12 made of Pyrex, described later, is high.

Figure 3:
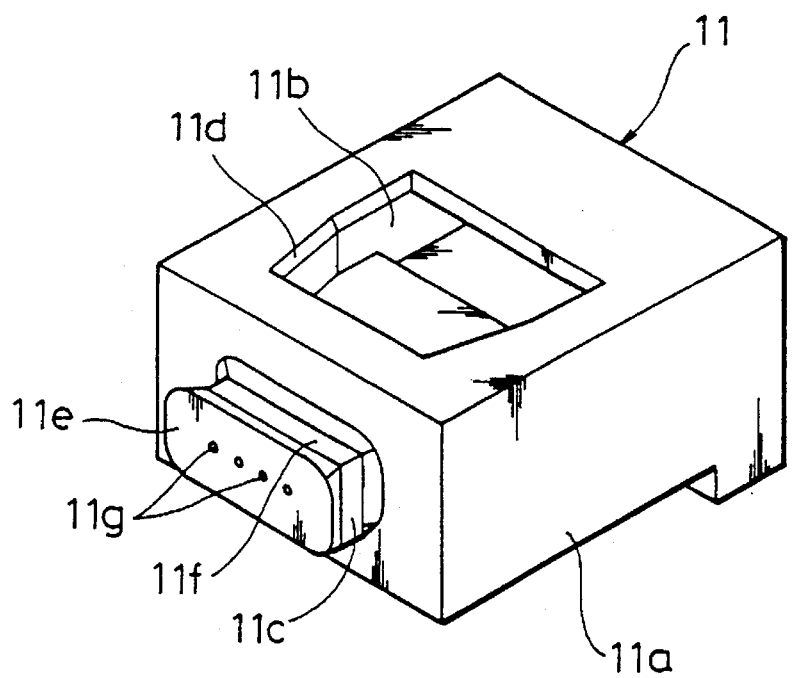
FIG. 3 is a perspective view of a ferrule used for the optical fiber end portion shown in FIG. 1.
Figure 4:
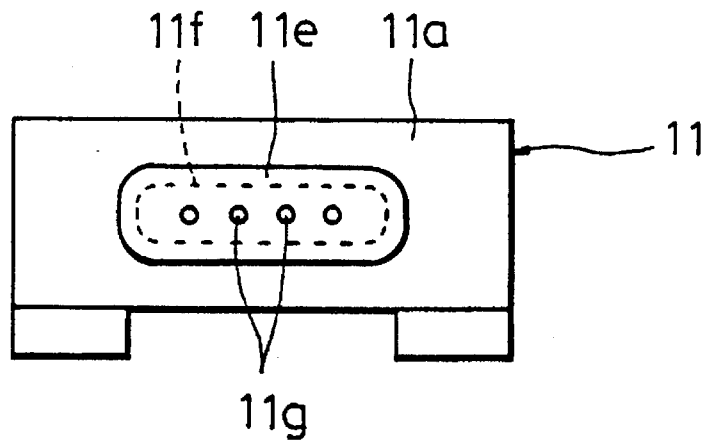
FIG. 4 is a front view of the ferrule shown in FIG. 3.
Figure 5:
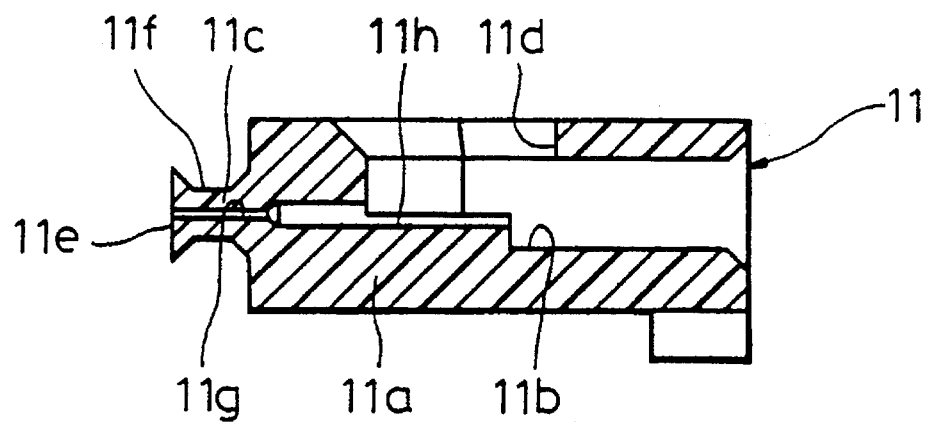
FIG. 5 is a sectional view of the ferrule shown in FIG. 3.

The ferrule 11 is a hollow member with a cavity 11b formed at the rear of the body 11a as shown in FIGS. 3 and 5. In front of the body 11a, a protruding portion 11c protrudes integrally to butt against an optical waveguide component 20, and at the upper portion of the body 11a, an opening 11d communicating with the cavity 11b is formed. The front face of the protruding portion 11c forms a butting end face 11e butting against the optical waveguide component 20. At the periphery of the protruding portion 11c, a groove 11f is formed, and the connecting member 12, which will be described later in detail, is disposed around the groove 11f (see FIGS. 1 and 7). The protruding portion 11c has openings on the butting end face 11e, four fiber holes 11g communicating with the cavity 11b being formed, as shown in FIGS. 4 and 5. In addition, a fiber guide 11h is formed at the protruding portion 11c at the position adjacent to each fiber hole 11g. The fiber guide 11h guides an optical fiber 13a, described later, into the fiber hole 11g to facilitate the insertion of the optical fiber.

Incidentally, the shapes of the protruding portion 11c and the groove 11f are determined by the shape of an opening 12a of the connecting member 12, described later, and the groove 11f is not always necessary.

The connecting member 12 is optically transparent, and made of Pyrex having a linear expansion coefficient $\alpha_{CM}$ of $3.0 \times 10^{-6}$ to $3.6 \times 10^6$, which is close to the linear expansion coefficient $\alpha_{OD}$ in the direction in which waveguides 22a are arranged in the optical waveguide component 20, which will be described later in detail. The connecting member 12 has an opening 12a surrounding the butting end face 11e, and is formed, together with the butting end face 11e, into a rectangular frame shape so as to be butted against the optical waveguide component 20.

Figure 2:
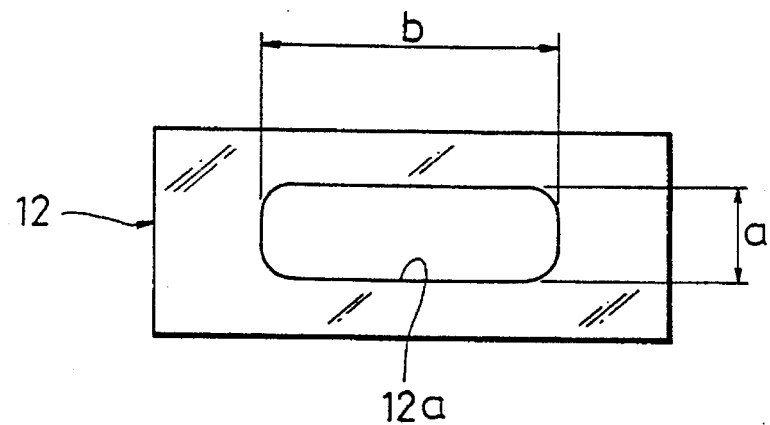
FIG. 2 is a front view of a connecting member installed on the butting end face of a ferrule of the optical fiber end portion shown in FIG. 1.

The size of the opening 12a affects the strength of the connecting member 12, the moldability, and the ultraviolet radiation time in connecting the end portion 10 to the optical waveguide component 20. Therefore, the length in the direction at right angles to the direction in which optical fibers are arranged (hereinafter called "vertical length") a (mm), as shown in FIG. 2, is set so as to fall within the range $0.2 \leq a \leq 1.0$, and the length in the direction in which optical fibers are arranged (hereinafter called "horizontal length") b (mm), as shown in FIG. 2, is set so as to provide the relationship of $b = P \times (N-1) + a$, where N is the number of fiber holes 11g, and therefore the number of optical fibers 13a, described later, of the tape fiber 13, and P is the arrangement interval (mm) of optical fibers 13a.

If the area of the front portion of the connecting member 12 relative to the whole area of the butting end face 11e is small, and therefore the area ratio of the connecting member 12 is lower than the proper value, the connecting member 12 is cracked by the filling pressure of synthetic resin in molding the ferrule 11, or the connecting member 12 is broken due to heat cycle, etc. For this reason, a problem of decreasing the reliability of the manufactured ferrule 11 and in turn the end portion 10, and other problems arise. Also, when bonding is performed by using a light curing type adhesive, it is difficult for the irradiated light to transmit to the center of the end face, so that the bonding to the optical waveguide component 20 takes much time.

If the aforementioned area of the connecting member 12 relative to the whole area of the butting end face 11e is large, and therefore the aforementioned area ratio is higher than the proper value, the manufacture of the connecting member 12 requires high dimensional accuracy. For this reason, the manufacturing cost of the ferrule and in turn the end portion 10 increases. In molding the ferrule 11, if the setting operation for setting the connecting member 12 in the mold is not performed carefully, troubles are developed frequently; for example, the fiber holes 11g come too close to the connecting member 12 in the molded ferrule 11, and the molding pin comes in contact and is broken or bent.

Therefore, the dimensions of the opening 12a of the connecting member 12 are set as described above.

The ferrule 11 is manufactured by using a mold described below.

Figure 6:
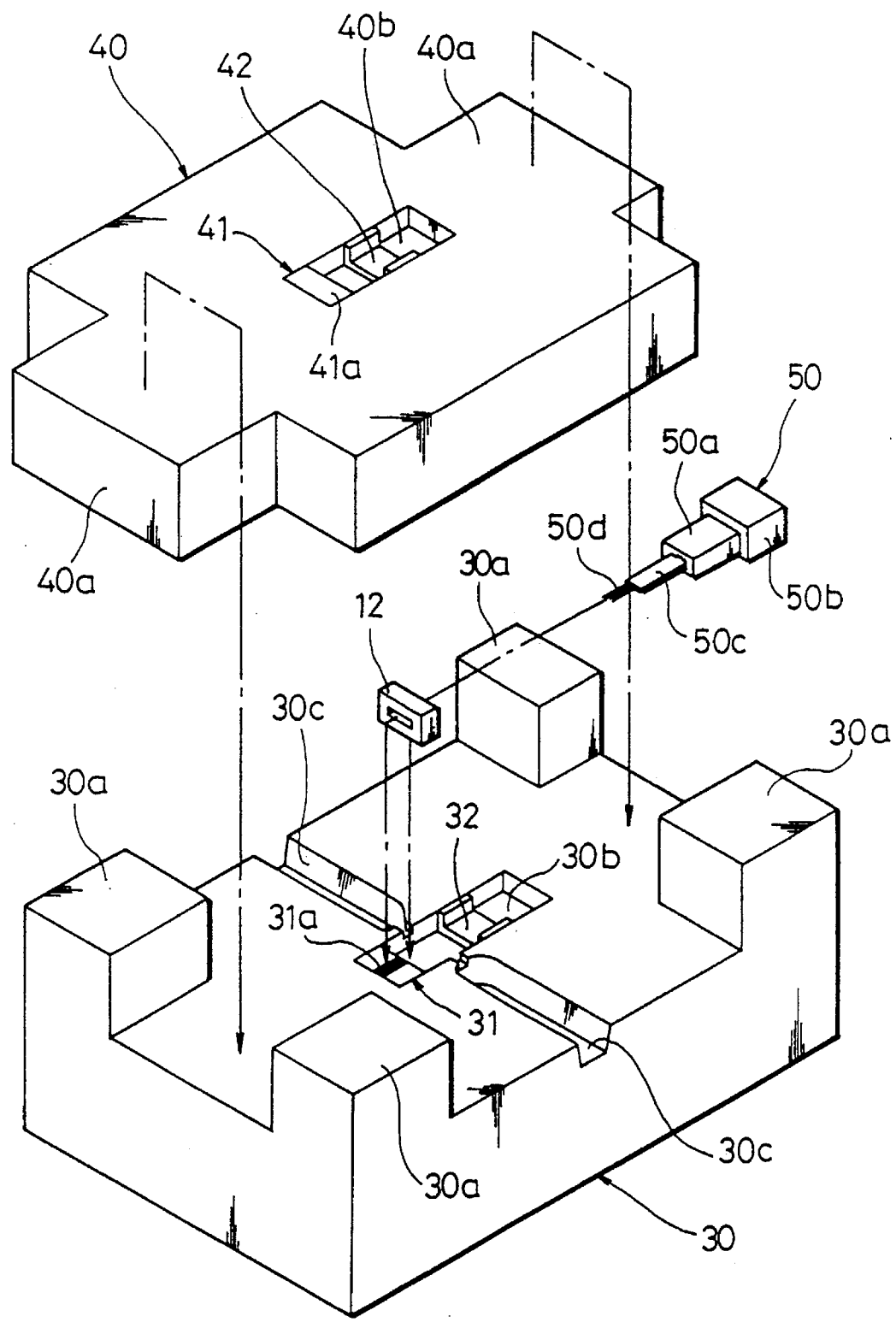
FIG. 6 is a perspective view of a mold used for manufacturing the ferrule shown in FIG. 3.

FIG. 6 shows a mold used in manufacturing the ferrule 11. This mold includes a lower mold 30, an upper mold 40, and a core 50 arranged between the lower and upper molds 30 and 40.

The lower mold 30 is raised or lowered by a driving means (not shown) for closing or opening with respect to the upper mold 40. As shown in FIG. 6, the lower mold 30 is integrally provided with convex portions 30a for positioning the upper mold 40 at four corners of a rectangular plate, and a concave portion 30b for arranging forming molds 31 and 32 at the center. Also, the lower mold 30 is provided with runners 30c, 30c on both sides toward the concave portion 30b.

The forming mold 31 is a flat plate shaped member arranged at one end of the concave portion 30b, and a V groove 31a for positioning the tip end of a molding pin 50d, described later, of the core 50 is formed in the top surface of the forming mold 31. The forming mold 32 is a U-shaped member which is arranged approximately at the center of the concave portion 30b, in which the forming mold 31 is arranged, for supporting a body 50a, described later, of the core 50. When closing the lower mold 30 and the upper mold 40, a cavity (not shown) for forming a ferrule 11 in the front portion is formed. The forming mold 32 positions a collar portion 50b, described later, of the core 50 in the concave portion 30b.

The upper mold 40 is integrally provided with flange portions 40a, 40a, which are arranged between the convex portions 30a, 30a of the lower mold 30 to position the upper mold 40 with respect to the lower mold 30, on both sides of a rectangular plate, as shown in FIG. 6. A concave portion 40b is formed for arranging forming molds 41 and 42 at the center. In FIG. 6, the upper mold 40 is shown with its upper and lower surfaces being reversed for clarity of the construction. Actually, the upper mold 40 is arranged in opposition to the lower mold 30 by turning over as indicated by the dashed and dotted line in the figure.

The forming molds 41 and 42 have the same construction as the forming molds 31 and 32 except that the mold clamping surface 41a of the forming mold 41 has no V groove for positioning the molding pin 50d, described later; therefore, the corresponding characters are applied to the corresponding portions and the detailed explanation is omitted in the following description and the figure.

The core 50 has the collar portion 50b formed at the rear of the body 50a, and a core portion 50c for forming the cavity 11b of the ferrule 11 formed in front of the body 50a and four molding pins 50d for forming the fiber holes 11g protruding from the core portion 50c as shown in FIG. 6.

When the ferrule 11 is manufactured, first, the forming molds 31 and 32 are arranged in the concave portion 30b of the lower mold 30, and the forming molds 41 and 42 are arranged in the concave portion 40b of the upper mold 40 as shown in FIG. 6.

Next, the molding pins 50d are inserted into a connecting member 12 as indicated by the dashed and dotted line in the figure. The connecting member 12 is arranged in the concave portion 30b between the forming molds 31 and 32, and the collar portion 50b is arranged in the concave portion 30b at the rear of the forming mold 32. The tip end portions of the molding pins 50d are positioned by the V groove 31a. Thus, the core 50 is arranged in the lower mold 30.

Then, the lower mold 30 is raised by the aforementioned driving means (not shown), and the flange portions 40a of the upper mold are arranged between the convex portions 30a, 30a for closing the mold.

Thus, the connecting member 12 and the core 50 are arranged between the concave portion 30b of the lower mold 30 and the concave portion 40b of the upper mold 40. The base ends of the molding pins 50d are inserted into the inside portion of the connecting member 12, and a predetermined gap for forming the protruding portion 11c of the ferrule 11 is formed. Also, a cavity (not shown) for forming the body 11a of the ferrule 11 is formed between the lower mold 30 and the upper mold 40 at the position between the forming molds 32 and 42 located at the rear of the connecting member 12.

After that, the aforementioned optically transparent epoxy resin, which has a low heat shrinkage coefficient and contains silicon dioxide particles, is injected in the aforementioned cavity by using the runners 30c, 30c in the lower mold 30. Thus, the ferrule 11 is formed by transfer molding.

After the injected epoxy resin is cured by heating, the lower mold 30 is lowered to open the mold, and then the molded ferrule 11 is removed.

Then, the core 50 is drawn from the ferrule 11, completing the manufacture of the ferrule 11.

The ferrule 11 thus manufactured is fabricated into the end portion 10 by inserting the tape fiber from the rear side.

The tape fiber is a ribbon-shaped fiber bundle in which a plurality of optical fibers are arranged in parallel at predetermined intervals and a coating is applied to these optical fibers.

For the end portion 10 of this embodiment, the tape fiber is processed, and a predetermined length of coating is removed. The exposed optical fibers are inserted into the concave 11b from the rear side of the ferrule 11.

Figure 7:
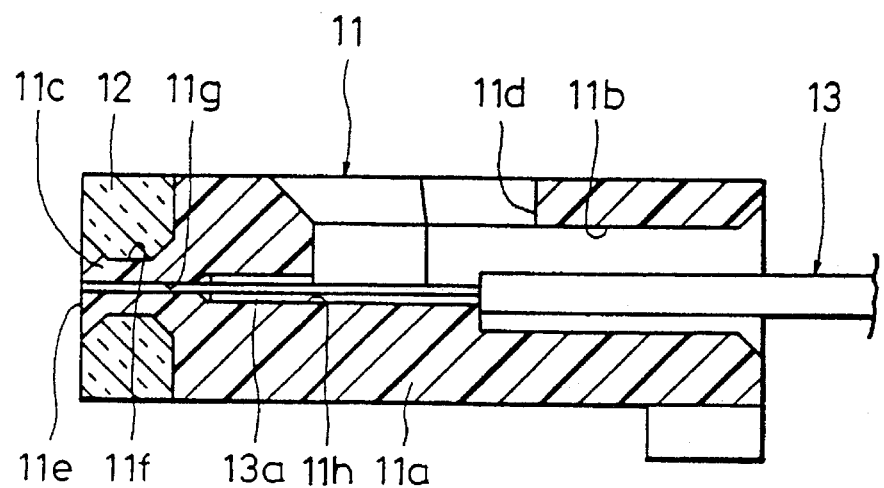
FIG. 7 is a perspective view showing a condition in which a tape fiber is inserted into a ferrule manufactured by using the mold shown in FIG. 6.
Figure 8:
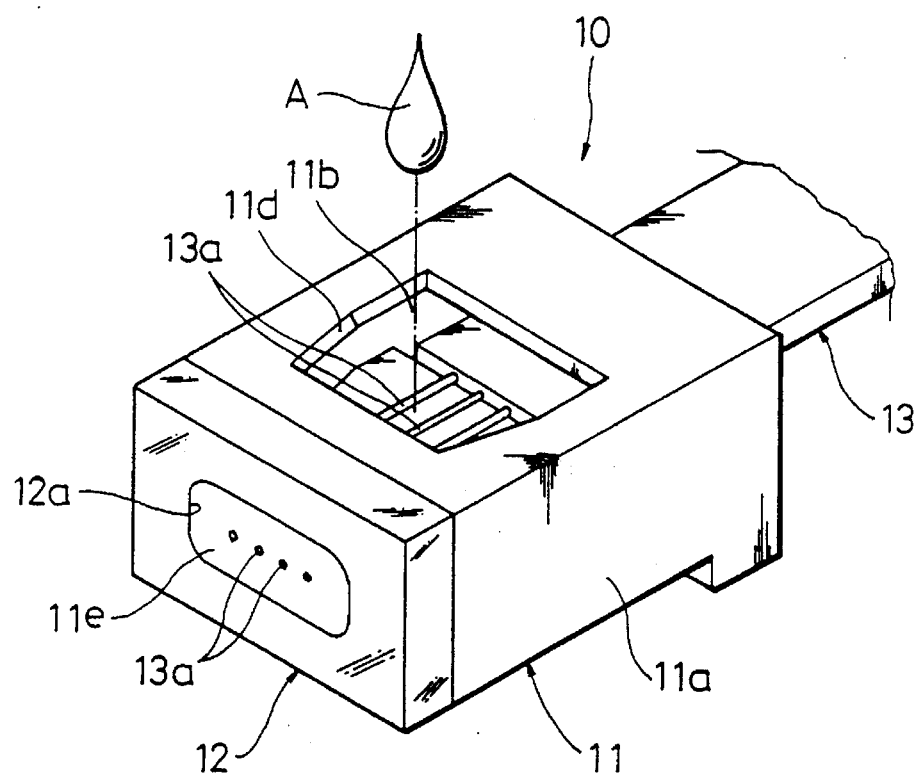
FIG. 8 is a perspective view showing a condition in which a tape fiber is fixed by injecting an adhesive to the ferrule shown in FIG. 7 to form an optical fiber end portion.

In the ferrule 11, as shown in FIG. 7, each optical fiber 13a of the tape fiber 13 is inserted into the corresponding fiber hole 11g. Then, as shown in FIG. 8, an adhesive A is poured in the cavity 11b through the opening 11d, so that the tape fiber 13 is fixed to the body 11a together with the optical fibers 13a.

For the tape fiber 13, the optical fibers 13a are extended from the protruding portion 11c, and the extended optical fibers are cut so as to be substantially flush with the butting end face 11e. Then, the end faces of the optical fibers 13a are polished by lapping etc. together with the butting end face 11e. Through these processes, the ferrule 11 is fabricated into the end portion 10.

In the manufactured end portion 10, the linear expansion coefficient $\alpha_{CM}$ of the connecting member 12 is set at a value lower than the linear expansion coefficient $\alpha_{FP}$ of the ferrule 11. For this reason, the connecting member 12 restricts the expansion of the protruding portion 11c in the transverse and vertical directions at high temperatures in molding the ferrule 11, and restricts the shrinkage in the cooling process after the completion of molding. Therefore, the fiber holes 11g of the ferrule 11, which open on the butting end face 11e, are formed at high accuracy because the expansion and shrinkage of the protruding portion 11c are restricted by the connecting member 12.

The plural optical fibers 13a exposed by removing the coating are buried and protected by an adhesive A in the cavity 11b of the ferrule 11 (see FIG. 9), so that the optical fibers 13a won't be broken even if a stress acts via the tape fiber 13.

The end portion 10 thus manufactured is bonded to the optical waveguide component 20 in a short period of time by applying an ultraviolet-curing adhesive, for example, epoxy- or acrylate-type adhesive and by radiating ultraviolet rays.

The optical waveguide component 20 is a component having a linear expansion coefficient $\alpha_{OD}$ of about $2.4 \times 10^{-6}$ in which a waveguide layer 22 consisting of silica with a thickness of several tens micrometers is formed on a 1 mm-thick silicon substrate 21, for example, by the flame hydrolysis deposition method or other methods, and a cover 23 formed of Pyrex having a linear expansion coefficient close to that of silicon is put on the waveguide layer 22. Both ends of the optical waveguide component 20 in the longitudinal direction form butting end faces.

In the waveguide layer 22, four waveguides 22a are formed in parallel at the same intervals as those of the plural optical fibers 13a in the longitudinal direction. The cover 23 ensures an effective bonding area between the optical waveguide component 20 and the end portion 10 by making the area and shape of the butting end face of the optical waveguide component 20 substantially equal to those of the end face of the end portion 10.

The optical waveguide component 20 may be a waveguide layer 22 formed on a silicon substrate 21 without a cover 23. The waveguide 22a formed in the waveguide layer 22 may be single.

In bonding the optical waveguide component 20 to the end portion 10, they are bonded after the waveguides 22a are aligned with the corresponding optical fibers 13a on the order of submicrons.

In this connecting construction of the end portion 10 and the optical waveguide component 20, the adhesive cures in a short period of time because the radiated ultraviolet rays transmit the portions of the ferrule 11 and the connecting member 12.

Figure 9:
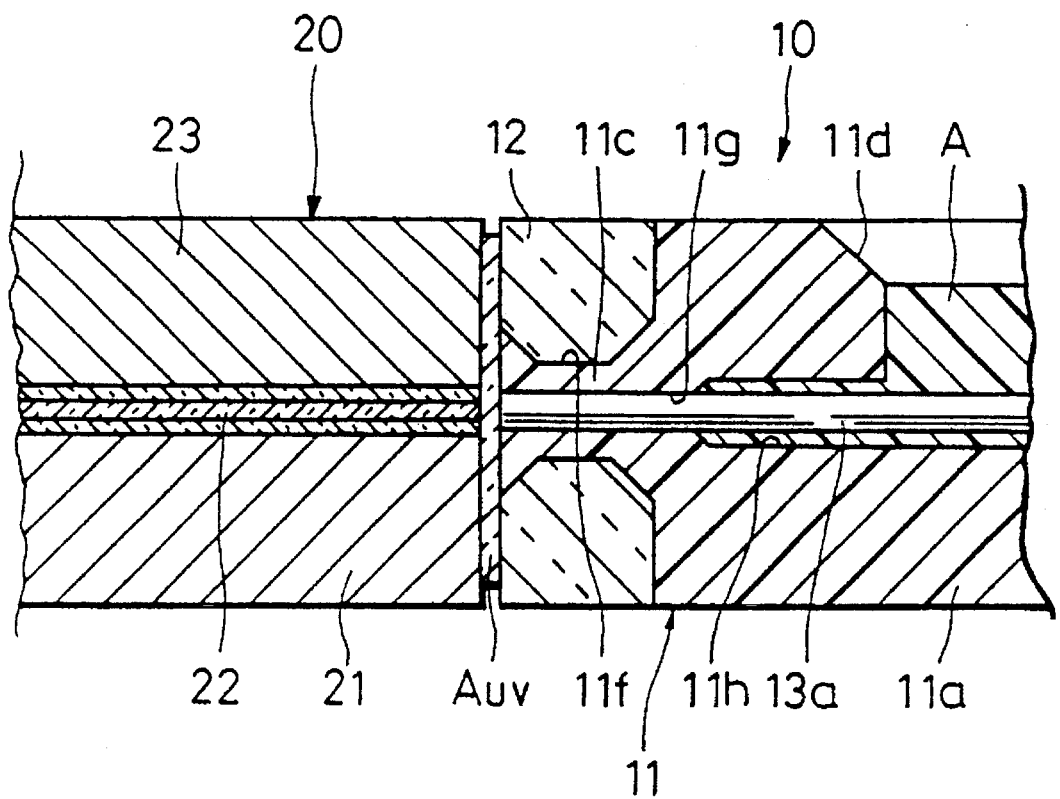
FIG. 9 is a sectional view of connecting construction in which an optical fiber end portion is bonded to an optical waveguide component.

Therefore, in the connecting construction of the end portion 10 and the optical waveguide component 20, bonding is reliably performed by using an ultraviolet-curing adhesive $A_{UV}$ at the portion of connecting member 12 as shown in FIG. 9, with the waveguides 22a being aligned with the corresponding optical fibers 13a on the order of submicrons.

Moreover, in the connecting construction of the end portion 10 and the optical waveguide component 20, the connecting member 12 has a linear expansion coefficient $\alpha_{CM}$ of $3.0 \times 10^{-6}$ to $3.6 \times 10^{-6}$, and the optical waveguide component 20 has a linear expansion coefficient $\alpha_{OD}$ of about $2.4 \times 10^{-6}$ establishing the relationship of $|\alpha_{CM} - \alpha_{OD}| < 5 \times 10^{-6}$.

Therefore, in the above connecting construction, since the difference in linear expansion coefficient between the end portion 10 and the optical waveguide component 20 caused by the temperature change with time is small, the change in dimensions due to the temperature change is kept small, so that the aligned condition between the waveguides 22a and the optical fibers 13a is not disturbed. Therefore, the use of the above connecting construction prevents the decrease in performance such as increase in connection loss with time between the end portion 10 and the optical waveguide component 20 and the loss of function.

In manufacturing the above-described ferrule 11, 30 ferrules having eight fiber holes 11g were formed of the aforementioned optically transparent epoxy resin, which has a low heat shrinkage coefficient and contains silicon dioxide particles, each under four different pressures of 90, 150, 200, and 250 kg.f/cm², with the vertical length a of the opening 12a of the connecting member 12 made of Pyrex being set at five different values in the range of 0.2 to 1.0 mm.

Because the arrangement interval of the fiber holes 11g was set at P=0.25 mm, the horizontal length b (mm) of the opening 12a was set at 1.95 to 2.75 mm from the aforementioned equation b=P×(N−1)+a since the number of the fiber holes 11g (=the number of cores of the tape fiber 13) was N=8.

Figure 10:
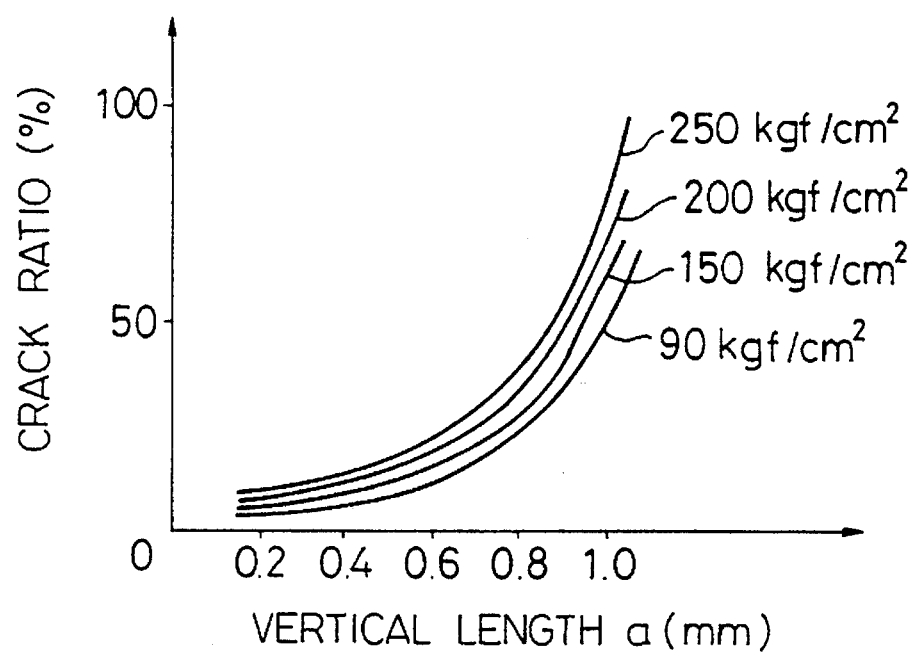
FIG. 10 is a characteristic diagram showing the relationship between the vertical length a of the opening of a connecting member and the crack ratio (%) for a molded ferrule.
Figure 11:
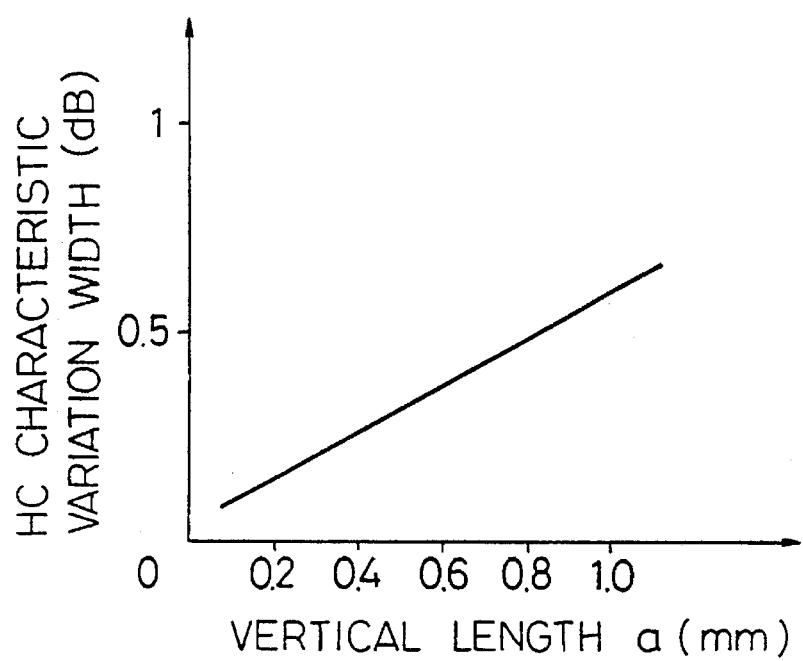
FIG. 11 is a characteristic diagram showing the relationship between the vertical length a of the opening of a connecting member and the heat cycle (HC) characteristic variation width (dB) in HC test.

For all the molded ferrules 11, the relationship between the vertical length a of the opening 12a of the connecting member 12 and the crack ratio (%) of the connecting member 12 was investigated, and for the ferrule molded under a pressure of 150 kg.f/cm², the HC characteristic variation width (dB) in heat cycle (HC) test and the acceptance ratio (%) in relation to the troubles associated with molding pins were investigated. The results of these investigations are shown in FIGS. 10 to 12.

The acceptance ratio (%) was determined as a percentage in relation to 30 molded ferrules each, the mold pin without any trouble such as breakage or bend being considered to be acceptable. The HC characteristic variation width (dB) shown in FIG. 11 indicated the average HC characteristic variation width for a total of ten molded ferrules in relation to the vertical length a.

Further, ten ferrules 11 sampled at random from each group of twenty molded ferrules 11 with different vertical length a were bonded to optical waveguide components 20 by applying an ultraviolet-curing adhesive between the ferrule 11 and the optical waveguide component 20 and by radiating ultraviolet rays. The radiation time (min.) of ultraviolet rays required for bonding the ferrule 11 to the optical waveguide component 20 in relation to the vertical length a was measured, and the result shown in FIG. 13 was obtained.

Therefore, from the results shown in FIGS. 10 to 13, it is found that in molding the ferrule 11, if the vertical length a of the opening 12a of the connecting member 12 exceeds 1.0 mm, the crack ratio exceeds 50%, and the radiation time of light curing type resin used for bonding to the optical waveguide component 20 undesirably becomes close to one hour.

If the vertical length a of the opening 12a is smaller than 0.2 mm, the resin filling space at the portion where fiber holes 11g are formed decreases in the mold shown in FIG. 6 in manufacturing the ferrule 11. For this reason, as is apparent from the acceptance ratio (%) shown in FIG. 12, troubles of molding pins such as breakage or bend occur frequently in molding.

Therefore, the vertical length a of the opening 12a should preferably be set at a value in the range of 0.2 to 1.0 mm.

If the horizontal length b of the opening 12a of the connecting member 12 is equal to the transverse width of the ferrule 11, that is, if the connecting member 12 is divided vertically into two, reference numeral 12a does not denote an opening. However, when the vertical length of the protruding portion 11c of the ferrule 11 corresponded to the vertical length a of the opening 12a, the ferrule 11 was manufactured with high yield as described above.

In the end portion 10 of the above embodiment, the connecting member 12 has been a rectangular frame body made of Pyrex which is installed on the side of the butting end face 11e. However, the connecting member is, needless to say, not limited to the configuration of the above embodiment if it is installed on the side of the butting end face and ultraviolet rays transmit the connecting portion between the end portion and the optical waveguide component.

Figure 14:
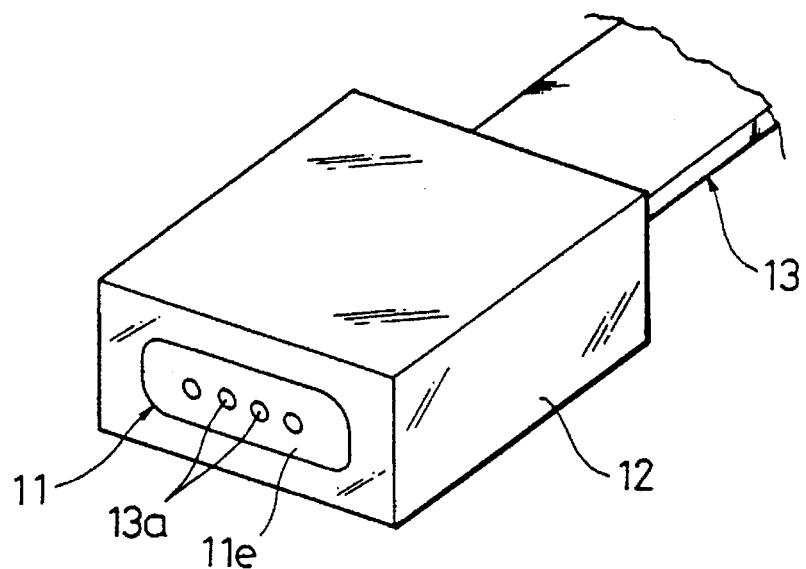
FIGS. 14 to 19 are perspective views of modifications of optical fiber end portions.
Figure 15:
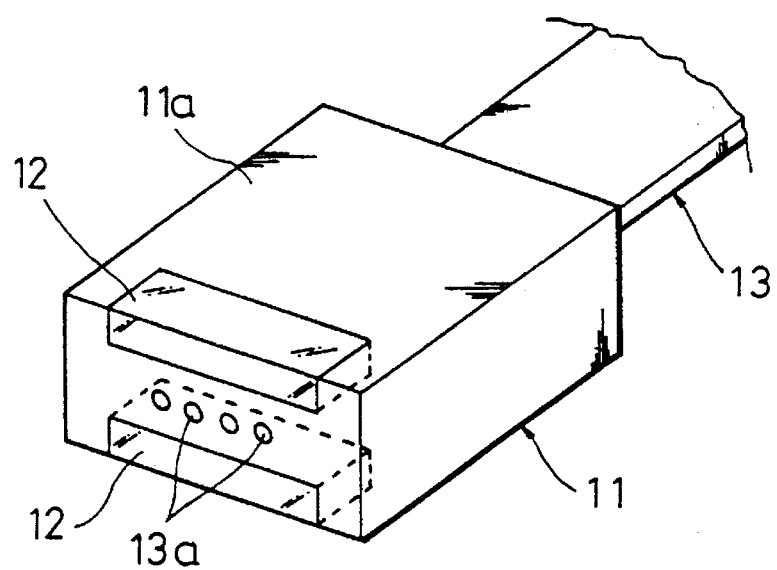

Therefore, the connecting member 12, for example, as shown in FIG. 14, may be arranged so as to surround the outer periphery of the ferrule 11 together with the butting end face 11e. Alternatively, as shown in FIG. 15, square rod shaped connecting members 12, 12 are arranged at the upper and lower portions of the ferrule 11 corresponding to the bonding portion to the optical waveguide component.

Figure 16:
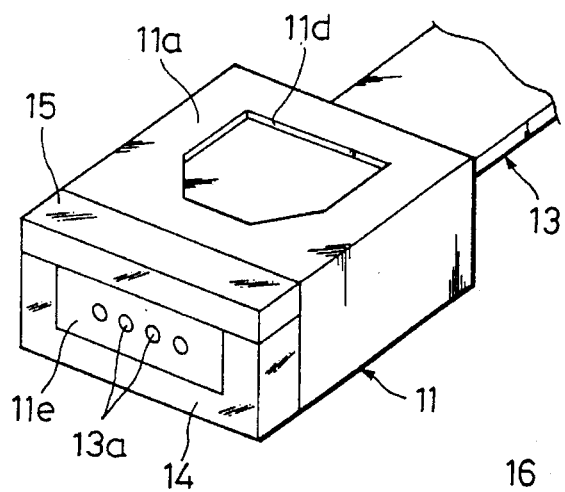
Figure 17:
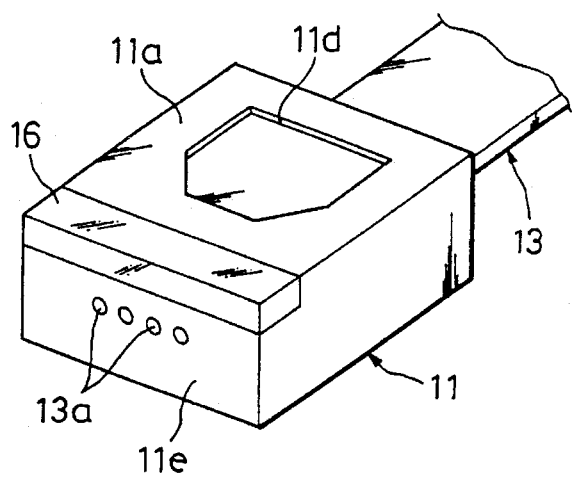

Further, as shown in FIG. 16, the connecting member may consist of two connecting members, one being of U shape and the other being of square rod shape, surrounding the butting end face 11e of the ferrule 11 from up and down. Alternatively, as shown in FIG. 17, the connecting member may be a square rod shaped member 16 arranged in the width direction above the butting end face 11e of the ferrule 11.

Figure 18:
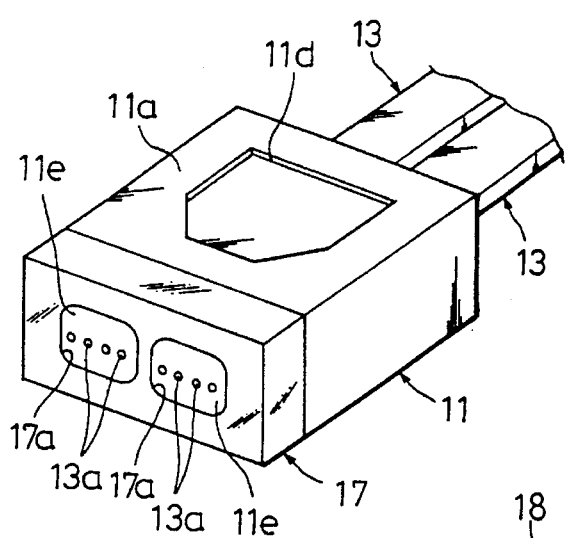
Figure 19:
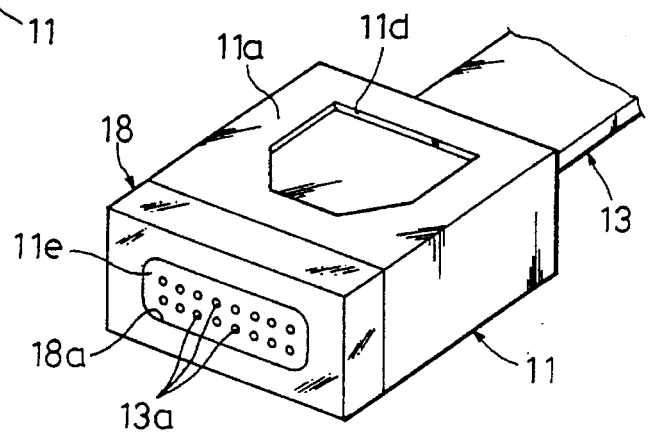

Still further, as shown as the connecting member 17 in FIG. 18, the connecting member may be of a shape having two openings 17a surrounding two butting end faces 11e of the ferrule 11 formed on the protruding portions 11c at two places, or may be of a shape having an opening 18a surrounding the butting end face 11e of the ferrule 11 as shown as the connecting member 18 in FIG. 19. In this case, the ferrule 11 provided with the connecting member 18 has ends of a plurality of optical fibers 13a exposed to the butting end face 11e, the optical fibers being arranged in two rows vertically.

Second Embodiment

Next, the second embodiment of the present invention will be described in detail with reference to FIGS. 20 and 21.

Figure 20:
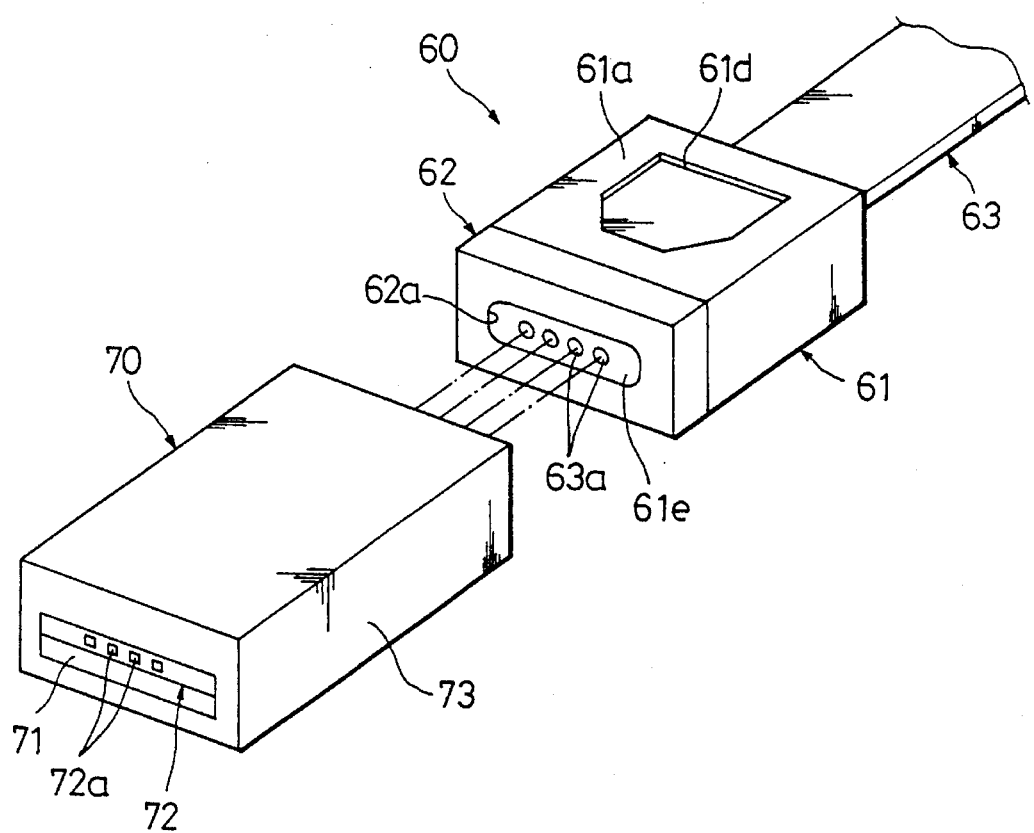
FIG. 20 is a perspective view showing an optical fiber end portion and the connection of the end portion to an optical waveguide component, illustrating a second embodiment of the present invention.
Figure 21:
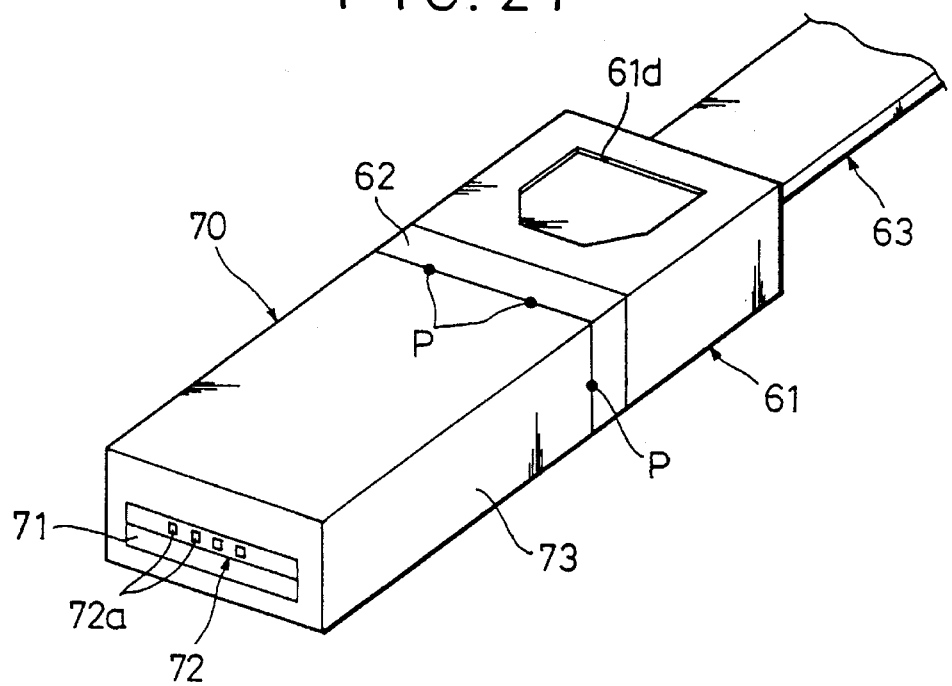
FIG. 21 is a perspective view showing construction for connecting an optical fiber end portion to an optical waveguide component.

An end portion 60 of this embodiment, being configured so as to have a connecting member 62 attached in front of a ferrule 61 and a tape fiber 63 attached to the ferrule 61 as shown in FIG. 20, is butted against and welded to an optical waveguide component 70 as shown in FIG. 21.

The ferrule 61 is configured in substantially the same way as the ferrule 11 described in the first embodiment; therefore, the corresponding reference characters are applied to the corresponding elements, and the detailed explanation is omitted.

The ferrule 61 is made of a synthetic resin having a linear expansion coefficient $\alpha_{FP}$ of $12 \times 10^{-6}$ for example epoxy resin by using the molds 30 and 40 and the core 50, which have been described for the first embodiment. Because the end portion 60 is connected to the optical waveguide component 70 by welding in this embodiment, the ferrule 61 need not be optically transparent.

The connecting member 62 has an opening 62a surrounding the butting end face 61e of the ferrule 61, and is formed into a rectangular frame of a weldable metal having a low linear expansion coefficient, for example, Kovar (registered tradename of the product of Westinghouse Electric Corp., U.S.) having a linear expansion coefficient $\alpha_{MC}$ of $2\times10^{-6}$ to $4\times10^{-6}$. As in the first embodiment the vertical length a (mm) of the opening 62a is set so as to fall within the range $0.2 \leq a \leq 1.0$, and the horizontal length b (mm) thereof is set so as to provide the relationship of $b=P\times(N-1)+a$, where N is the number of optical fibers 63a forming the tape fiber 63, and P is the arrangement interval (mm) of optical fibers 63a.

Thus, in the end portion 60, the linear expansion coefficient $\alpha_{MC}$ of the connecting member 62 is set at a value lower than the linear expansion coefficient $\alpha_{FP}$ of the ferrule 61. For this reason, the connecting member 62 restricts the expansion of the protruding portion 61c in the transverse and vertical directions at high temperatures in molding the ferrule 61, and restricts the shrinkage in the cooling process after the completion of molding.

Therefore, the fiber holes of the ferrule 61, which open on the butting end face 61e, are formed at high accuracy because the expansion and shrinkage of the protruding portion are restricted by the connecting member 62.

The plural optical fibers 63a of the tape fiber 63 are buried and protected by an adhesive in the cavity of the ferrule 61, so that the optical fibers won't be broken even if a stress acts via the tape fiber 63.

The optical waveguide component 70 includes a 1-mm thick silicon substrate 71 and a waveguide layer 72 formed on the silicon substrate 71, which are surrounded by a tubular square sleeve 73. Both ends of the optical waveguide component 70 in the longitudinal direction form butting end faces.

The waveguide layer 72 has four waveguides 72a formed in parallel at the same intervals as those of the plural optical fibers 63a in the longitudinal direction. The waveguide layer 72 is formed so as to have a thickness of several tens micrometers, for example, by the flame hydrolysis deposition method using silica or other methods.

The square sleeve 73, which has a linear expansion coefficient equal to or close to that of the connecting member 62, can be welded to the connecting member 62, and is made of, for example, Kovar having a linear expansion coefficient $\alpha_{MO}$ of $2\times10^{-6}$ to $4\times10^{-6}$.

The square sleeve 73 ensures an effective welding area between the optical waveguide component 70 and the end portion 60 by making the area and shape of the butting end face of the optical waveguide component 70 substantially equal to those of the connecting member 62 of the end portion 60.

The end portion 60 of this embodiment, which is configured as described above, is butted against the optical waveguide component 70, and alignment is performed between the optical fiber 63a and the corresponding waveguide 72a.

Thereafter, as shown in FIG. 21, the square sleeve 73 is welded to the connecting member 62 at appropriate welding points P by YAG laser beam welding to connect the end portion 60 to the optical waveguide component 70.

Therefore, in the connecting construction of the end portion 60 and the optical waveguide component 70, the connecting member 62 has a linear expansion coefficient $\alpha_{MC}$ of $2\times10^{-6}$ to $4\times10^{-6}$ which is equal to the linear expansion coefficient $\alpha_{MO}$ of the square sleeve 73, and the principal includes the optical waveguide component 70 includes the silicon substrate 71 and the waveguide layer 72 has a linear expansion coefficient $\alpha_O$ of about $2.4\times10^{-6}$, establishing the relationship of $|\alpha_{MC}-\alpha a_O|<5\times10^{-6}$.

Therefore, in the above connecting construction, since there is no or a very small difference in linear expansion coefficient between the end portion 60 and the optical waveguide component 70 caused by the temperature change with time, the change in dimensions due to the temperature change is kept small, so that the aligned condition between the waveguides 72a and the optical fibers 63a is not disturbed. Therefore, the use of the above connecting construction prevents the decrease in performance such as increase in connection loss with time between the end portion 60 and the optical waveguide component 70 and the loss of function.

Third Embodiment

Further, a third embodiment of the present invention will be described in detail with reference to FIG. 22.

Figure 22:
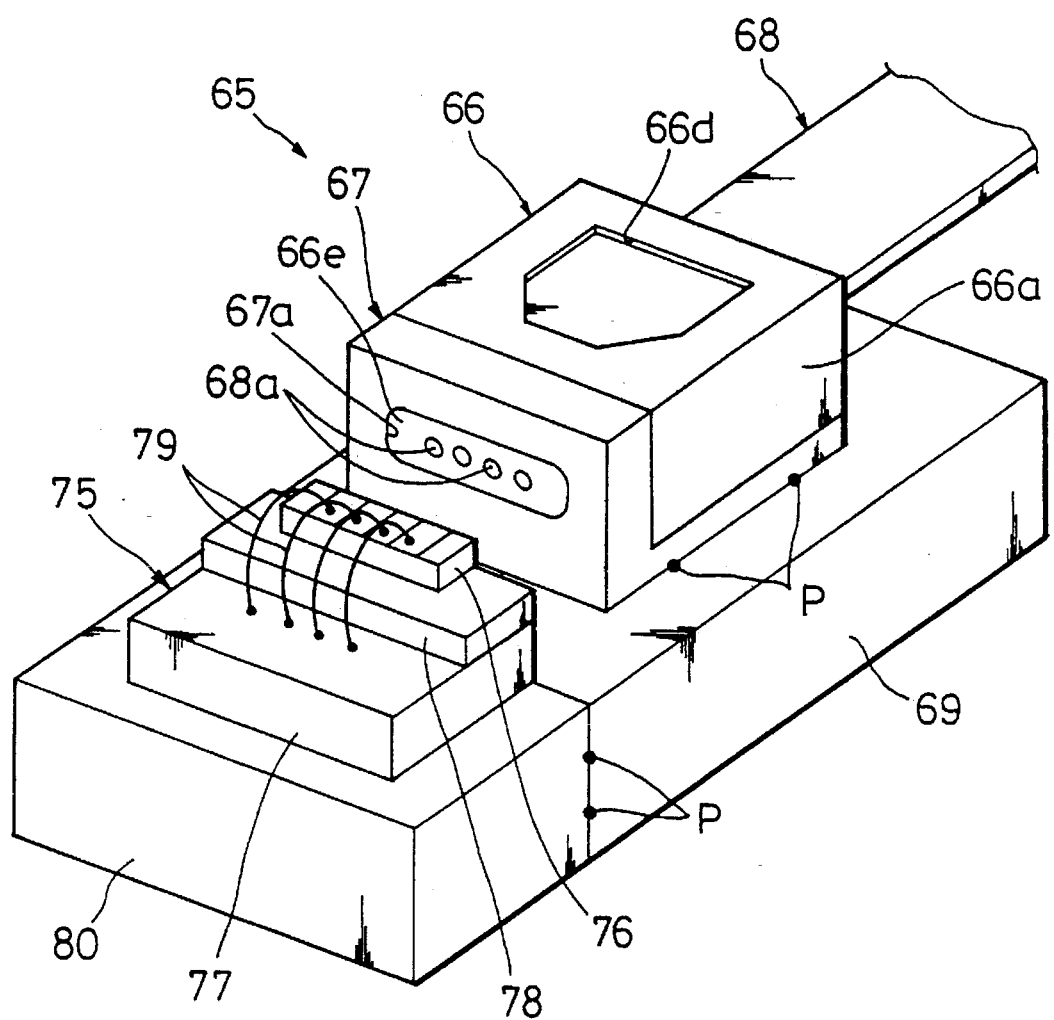
FIG. 22 is a perspective view showing an optical fiber end portion and construction for connecting the end portion to an optical waveguide component, illustrating a third embodiment of the present invention.

An end portion 65 of this embodiment is configured so as to have a connecting member 67 arranged through the front and lower portions of a ferrule 66 and a tape fiber 68 is attached to the ferrule 66, and is butted against and welded to an optical waveguide component 75, as shown in FIG. 22.

The ferrule 66 is configured in substantially the same way as the ferrule 11 described in the first embodiment; therefore, the detailed explanation is omitted.

The ferrule 66 is made of a synthetic resin having a linear expansion coefficient $\alpha_{FP}$ of $12\times10^{-6}$ for example, epoxy resin by using the molds 30 and 40 and the core 50, which have been described for the first embodiment. Because the end portion 65 is connected to the optical waveguide component 75 by welding in this embodiment, the ferrule 66 need not be optically transparent.

The connecting member 67 has an opening 67a surrounding the butting end face 66e of the ferrule 66, and is formed into an L shape, viewed from the side, and made of a weldable metal having a low linear expansion coefficient, for example, Kovar having a linear expansion coefficient $\alpha_{MC}$ of $2\times10^{-6}$ to $4\times10^{-6}$. The vertical length a (mm) of the opening 67a is set so as to fall within the range $0.2 \leq a \leq 1.0$, and the horizontal length b (mm) thereof is set so as to provide the relationship of $b=P\times(N-1)+a$, where N is the number of fiber holes of the ferrule 66, and therefore the number of optical fibers 68a forming the tape fiber 68, and P is the arrangement interval (mm) of optical fibers 68a.

Thus, in the end portion 65, the linear expansion coefficient $\alpha_{MC}$ of the connecting member 67 is set at a value lower than the linear expansion coefficient $\alpha_{FP}$ of the ferrule 66. For this reason, the connecting member 67 restricts the expansion of the protruding portion in the transverse and vertical directions at high temperatures in molding the ferrule 66, and restricts the shrinkage in the cooling process after the completion of molding.

Therefore, the fiber holes of the ferrule 66, which open in the butting end face 66e, are formed at high accuracy because the expansion and shrinkage of the protruding portion are restricted by the connecting member 67. As a result, the plural optical fibers 68a are arranged with high accuracy.

The plural optical fibers 68a of the tape fiber 68 are buried and protected by an adhesive in the cavity of the ferrule 66, so that the optical fibers won't be broken even if a stress acts via the tape fiber 68.

The optical semiconductor 75 has a heat sink 78 arranged between an LD array 76, in which a plurality of laser diode (LD) elements are arranged in line, and a carrier 77. Each laser diode element is electrically connected to the carrier 77 with a bonding wire 79, and the carrier 77 is fixed to a metallic mount base 80. The mount base 80 has a linear expansion coefficient $\alpha_{MB}$ of $2\times10^{-6}$ to $4\times10^{-6}$, close to the linear expansion coefficient $\alpha_{MC}$ of the connecting member 67.

The end portion 65 of this embodiment, configured as described above, is mounted on a base 69, which is arranged by butting against the mount base 80, so as to be in opposition to the optical semiconductor 75. The base 69 has a linear expansion coefficient $\alpha_B$ of $2\times10^{-6}$ to $4\times10^{-6}$, close to the linear expansion coefficient $\alpha_{MC}$ of the connecting member 67.

Then, the inclination in three axis directions X, Y, and Z and the optical axis direction is adjusted between each optical fiber 68a and the corresponding laser diode element of the optical semiconductor 75.

Thereafter, the end portion 65 is welded to the base 69 and the base 69 is welded to the mount base 80 at appropriate welding points P by YAG laser beam welding to connect the end portion 65 to the optical semiconductor 75.

In the above-described connecting construction, the end portion 65 is connected to the optical semiconductor 75 by using the base 69 having a linear expansion coefficient $\alpha_B$ close to the linear expansion coefficient $\alpha_{MC}$ of the connecting member 67 and the linear expansion coefficient $\alpha_{MB}$ of the mount base 80. Therefore, the differences in linear expansion coefficient $|\alpha_B-\alpha_{MC}|$ and $|\alpha_B-\alpha_{MB}|$ become smaller than $5\times10^{-6}$.

Therefore, in the above connecting construction, since the difference in linear expansion coefficient between the end portion 65 and the optical semiconductor 75 caused by the temperature change with time is small, the change in dimensions due to the temperature change is kept small, so that the aligned condition between the optical fibers 68a and the corresponding laser diode element of the optical semiconductor 75 is not disturbed. Therefore, the use of the above connecting construction prevents the decrease in performance such as increase in connection loss with time between the end portion 65 and the optical semiconductor 75 and the loss of function.

INDUSTRIAL APPLICABILITY

As is apparent from the above description, the present invention provides an optical fiber end portion which can be connected to an optical device accurately, and manufactured easily and in which optical fibers are less prone to be broken, a method for manufacturing such optical fiber end portions, and construction for connecting the end portion to an optical device.

When the linear expansion coefficient $\alpha_{CM}$ of the connecting member is set at a value lower than the linear expansion coefficient $\alpha_{FP}$ of the synthetic resin forming the aforementioned ferrule, the connecting member of the optical fiber end portion restricts thermal expansion and shrinkage of the synthetic resin. Therefore, the fiber holes of the ferrule can be formed with high accuracy.

Also, when the aforementioned connecting member is made of an optically transparent material, for example, glass at least part of which is exposed to the outer periphery of the butting end face of the ferrule, the optical fiber end portion can be connected to the optical device in a short period of time by using a light curing type adhesive.

Further, when the ferrule is a molded body formed of any of thermosetting, thermoplastic, and light-curing synthetic resins, the ferrule of the optical fiber end portion can be molded at a low cost by using a mold.

Also, when the synthetic resin containing silicon dioxide, which forms the ferrule, contains a coupling agent, the adhesion between the ferrule and the glass connecting member of the optical fiber end portion is improved.

Further, when the synthetic resin forming the ferrule is an optically transparent material having a refractive index close to that of the aforementioned silicon dioxide, irradiated light easily passes through the optical fiber end portion in connecting the end portion to the optical device, so that the light curing type adhesive used cures in a short period of time, thereby shortening the time required for the work for connection to the optical device. Particularly when the synthetic resin forming the ferrule is a material which does not contain coloring component or carbon, the absorption of irradiated light by the ferrule decreases, so that heat generation at the optical fiber end portion can be reduced, by which the change in dimensions of the ferrule due to the rise in temperature can be restricted.

The connecting member is made of glass having a linear expansion coefficient $\alpha_{CM}$ which provides the relationship of $|\alpha_{CM}-\alpha_{OD}|<5\times10^{-6}$, where $\alpha_{OD}$ is the linear expansion coefficient of the material of the optical device, or made of a metal which is butted against and welded to a metallic member installed at the corresponding position of the optical device and has a linear expansion coefficient $\alpha_{MC}$ which provides the relationship of $|\alpha_{MC}-\alpha_{MO}|<5\times10^{-6}$, where $\alpha_{MO}$ is the linear expansion coefficient of the metallic member.

Thereupon, since the difference in linear expansion coefficient between the optical fiber end portion and the optical device caused by the temperature change with time is small, the change in dimensions due to the temperature change is kept small, so that the decrease in performance such as increase in connection loss with time and the loss of function can be prevented.

The connecting member has an opening surrounding the butting end face of the ferrule, and the size of the opening is determined so that the length a (mm) in the direction at right angles to the direction in which optical fibers are arranged is set so as to fall within the range $0.2 \leq a \leq 1.0$, and the length b (mm) in the direction in which optical fibers are arranged is set so as to provide the relationship of $b=P\times(N-1)+a$, where N is the number of optical fibers fixed to the ferrule, and P is the arrangement interval of optical fibers. Thereupon, in the optical fiber end portion, the ratio of the area of the connecting member to the whole area of the butting end face can be set properly, by which the yield in forming the ferrule is enhanced.

In the construction for connecting the optical fiber end portion of the present invention to an optical device, when the optical device, being an optical waveguide component in which a plurality of waveguides with arrangement intervals equal to those of the plural optical fibers are formed, is bonded to the optical fiber end portion at the portion of connecting member installed on the ferrule by means of an ultraviolet-curing adhesive, the optical fiber end portion can be connected to the optical waveguide component in a short time on the order of seconds.

Further, the optical device is an optical waveguide component which is so configured that a plurality of waveguides with arrangement intervals equal to those of the plural optical fibers are formed and a metallic tube surrounds the outer periphery of the waveguides, and the metallic connecting member of the optical fiber and portion is welded to the end face of the metallic tube. Alternatively, the optical device, being an optical semiconductor on which a plurality of laser diode elements are arranged, is mounted on a first metal base. On the other hand, the optical fiber end portion is mounted on a second metal base so as to be in opposition to the optical device. The end portion is mounted so that the optical fibers are aligned with the corresponding laser diode elements, and the first and second metal bases are welded to each other.

Thus, the connecting construction in which the optical fiber end portion is connected to the optical waveguide component or the optical semiconductor by welding can be provided.

I claim:

1. A multifiber connector for connecting together a plurality of optical fibers, comprising:
   a ferrule having:
      a butting end face positioned opposite an optical device, and
      a plurality of fiber holes formed in parallel at predetermined intervals and extending through said butting end face, one end of each optical fiber being inserted into and fixed in each of the fiber holes and being optically connected to said optical device, and
   said ferrule being a single molded product made of synthetic resin; and
   a connecting member arranged on at least a portion of said butting end face and connected one of (i) directly and (ii) indirectly to said optical device by one of (iii) an adhesive and (iv) by welding.

2. A multifiber connector according to claim 1, wherein said connecting member is made of an optically transparent material at least a part of which is exposed to an outer periphery of the butting end face of said ferrule.

3. A multifiber connector according to claim 2, wherein said connecting member is made of glass having a linear expansion coefficient $\alpha_{CM}$ which provides the relationship of $$|\alpha_{CM} - \alpha_{OD}| < 5 \times 10^{-6}$$

where $\alpha_{OD}$ is the linear expansion coefficient of the material of said optical device.

4. A multifiber connector according to claim 3, wherein said connecting member has an opening surrounding a periphery of the butting end face of said ferrule, and the size of said opening is determined so that a length (a) in the direction at right angles to the direction in which the optical fibers are arranged is set so as to fall within the range between 0.2 and 1.0 mm, and a length (b) in the direction in which the optical fibers are arranged is set so as to provide the relationship of b=P×(N−1)+a, where N is the number of optical fibers fixed to said ferrule, and P is the arrangement interval of optical fibers.

5. A multifiber connector according to claim 1, wherein said ferrule is a molded product formed of any of thermosetting, thermoplastic, and light-curing synthetic resins.

6. A multifiber connector according to claim 5, wherein the synthetic resin forming said ferrule contains a coupling agent and silicon dioxide as a filler.

7. A multifiber connector according to claim 6, wherein a synthetic resin forming said ferrule is optically transparent and has a refractive index close to that of said silicon dioxide.

8. An optical fiber end portion according to claim 1, wherein said connecting member is made of metal.

9. A multifiber connector according to claim 8, wherein said connecting member is butted against and welded to a metallic member installed at the corresponding position of said optical device, and has a linear expansion coefficient $\alpha_{MC}$ which provides the relationship of $$|\alpha_{MC} - \alpha_{MO}| < 5 \times 10^{-6}$$

where $\alpha_{MO}$ is the linear expansion coefficient of said metallic member.

10. A multifiber connector according to claim 10, wherein said connecting member has an opening surrounding a periphery of the butting end face of said ferrule, and the size of said opening is determined so that a length (a) in the direction at right angles to the direction in which the optical fibers are arranged is set so as to fall within the range between 0.2 and 1.0 mm, and a length (b) in the direction in which the optical fibers are arranged is set so as to provide the relationship of b=P×(N−1)+a, where N is the number of optical fibers fixed to said ferrule, and P is the arrangement interval of optical fibers.

11. A multifiber connector according to claim 8, wherein said ferrule is a molded product formed of any of thermosetting, thermoplastic, and light-curing synthetic resins.

12. A construction for connecting the multifiber connector defined in claim 1 to an optical device, wherein said multifiber connector is connected to the optical device so as to be opposed to said optical device.

13. A construction for connecting the multifiber connector as defined in claim 2 to an optical device, wherein:
   said optical device is an optical waveguide component in which a plurality of waveguides are formed at arrangement intervals equal to those of said plural optical fibers, and
   said optical device is bonded to said multifiber connector at a portion of said connecting member arranged on said ferrule by means of an ultraviolet-curing adhesive.

14. A construction for connecting the multifiber connector as defined in claim 8 to an optical device, wherein:
   said optical device is an optical waveguide component in which a plurality of waveguides are formed at arrangement intervals equal to those of said plural optical fibers and which has a metallic tube surrounding an outer periphery, and
   said optical device is welded to said multifiber connector at an end face of said metallic tube.

15. A construction for connecting a multifiber connector to an optical device, wherein:
   said optical device is an optical semiconductor in which a plurality of laser diode elements are arranged,
   said optical device is mounted on a first metal base,
   said multifiber connector is mounted on a second metal base so as to be in opposition to the optical device,
   said multifiber connector is mounted so that optical fibers mounted to the multifiber connector are aligned with the corresponding laser diode elements, and said first and second metal bases are welded to each other.

16. A multifiber connector according to claim 1, wherein said ferrule is a molded product formed of any of thermosetting, thermoplastic, and light-curing synthetic resins.

17. A multifiber connector according to claim 2, wherein said ferrule is a molded product formed of any of thermosetting, thermoplastic, and light-curing synthetic resins.

18. A multifiber connector according to claim 3, wherein said ferrule is a molded product formed of any of thermosetting, thermoplastic, and light-curing synthetic resins.

19. A multifiber connector according to claim 4, wherein said ferrule is a molded product formed of any of thermosetting, thermoplastic, and light-curing synthetic resins.

20. A multifiber connector according to claim 9, wherein said ferrule is a molded product formed of any of thermosetting, thermoplastic, and light-curing synthetic resins.

21. A multifiber connector according to claim 10, wherein said ferrule is a molded product formed of any of thermosetting, thermoplastic, and light-curing synthetic resins.

22. A multifiber connector for connecting together a plurality of optical fibers, comprising:
    a ferrule formed as a single molded product made of synthetic resin and having:
        a butting end face positioned opposite an optical device; and
        a plurality of fiber holes formed in parallel at predetermined intervals and extending through said butting end face, one end of each optical fiber being inserted into and fixed in each of the fiber holes and optically connected to the optical device;
    a connecting member arranged on at least a portion of the butting end face and connected one of (i) directly and (ii) indirectly to the optical device by one of (iii) an adhesive and (iii) by welding;
    the synthetic resin forming said ferrule having a linear expansion coefficient $\alpha_{FP}$; and
    said connecting member having a linear expansion coefficient $\alpha_{CM}$ which is set at a value smaller than the linear expansion coefficient $\alpha_{FP}$ of the synthetic resin forming said ferrule.

23. A multifiber connector according to claim 22, wherein said connecting member is made of an optically transparent material at least a part of which is exposed to an outer periphery of the butting end face of said ferrule.

24. A multifiber connector according to claim 23, wherein said connecting member is made of glass having a linear expansion coefficient $\alpha_{CM}$ which provides the relationship of $$|\alpha_{CM} - \alpha_{OD}| < 5 \times 10^{-6}$$

where $\alpha_{OD}$ is the linear expansion coefficient of the material forming said optical device.

25. A multifiber connector according to claim 24, wherein said connecting member has an opening surrounding a periphery of the butting end face of said ferrule, and said opening has a size such that a length (a) thereof in a direction at right angles to the direction in which the optical fibers are arranged falls within a range of 0.2 to 1.0 mm, and that a length (b) thereof in the direction in which the optical fibers are arranged satisfies a relationship of $$b = P \times (N-1) + a$$

where N is the number of optical fibers fixed to said ferrule, and P is the interval at which the optical fibers are arranged.

26. Multifiber connector according to claim 22, wherein said ferrule is a molded product formed of any of thermosetting, thermoplastic, and light-curing synthetic resins.

27. A multifiber connector according to claim 26, wherein the synthetic resin forming said ferrule contains a coupling agent, and silicon dioxide as a filler.

28. A multifiber connector according to claim 27, wherein the synthetic resin forming said ferrule is optically transparent and has a refractive index close to that of said silicon dioxide.

29. A multifiber connector according to claim 22, wherein said connecting member is made of metal.

30. A multifiber connector according to claim 29, wherein said connecting member is butted against and welded to a metallic fiber arranged at a corresponding position of said optical device, and has a linear expansion coefficient $\alpha_{MC}$ which provides the relationship of $$|\alpha_{MC} - \alpha_{MO}| < 5 \times 10^{-6}$$

where $\alpha_{MO}$ is the linear expansion coefficient of said metallic member.

31. A multifiber connector according to claim 30, wherein said connecting member has an opening surrounding a periphery of the butting end face of said ferrule, and said opening has a size such that a length (a) thereof in a direction at right angles to the direction in which the optical fibers are arranged falls within a range of 0.2 to 1.0 mm, and that a length (b) thereof in the direction in which the optical fibers are arranged satisfies a relationship of $$b = P \times (N-1) + a$$

where N is the number of optical fibers fixed to said ferrule, and P is the interval at which the optical fibers are arranged.

32. A multifiber connector according to claim 29, wherein said ferrule is a molded product formed of any of thermosetting thermoplastic, and light-curing synthetic resins.

33. A multifiber connector according to claim 23, wherein said ferrule is a molded product formed of any of thermosetting, thermoplastic, and light-curing synthetic resins.

34. A multifiber connector according to claim 24, wherein said ferrule is a molded product formed of any of thermosetting, thermoplastic, and light-curing synthetic resins.

35. A multifiber connector according to claim 25, wherein said ferrule is a molded product formed of any of thermosetting, thermoplastic, and light-curing synthetic resins.

36. A multifiber connector according to claim 30, wherein said ferrule is a molded product formed of any of thermosetting, thermoplastic, and light-curing synthetic resins.

37. A multifiber connector according to claim 31, wherein said ferrule is a molded product formed of any of thermosetting, thermoplastic, and light-curing synthetic resins.

* * * * *